March 12, 1968     F. S. MALVESTUTO, JR     3,372,891
MEANS AND METHOD OF ROTOR AUGMENTED LIFT FOR AIRPLANES
Filed Oct. 22, 1965     2 Sheets-Sheet 1

INVENTOR.
FRANK S. MALVESTUTO, JR.
BY
*Lyon+Lyon*
ATTORNEYS

March 12, 1968   F. S. MALVESTUTO, JR   3,372,891
MEANS AND METHOD OF ROTOR AUGMENTED LIFT FOR AIRPLANES
Filed Oct. 22, 1965   2 Sheets-Sheet 2

INVENTOR.
FRANK S. MALVESTUTO, JR.
BY
Lyon + Lyon
ATTORNEYS

United States Patent Office 3,372,891
Patented Mar. 12, 1968

3,372,891
MEANS AND METHOD OF ROTOR AUGMENTED LIFT FOR AIRPLANES
Frank S. Malvestuto, Jr., Granada Hills, Calif. (% Malvestuto Aero Space, 7333 Deering Ave., Canoga Park, Calif. 91303)
Filed Oct. 22, 1965, Ser. No. 500,719
3 Claims. (Cl. 244—12)

ABSTRACT OF THE DISCLOSURE

An aircraft having a wing provided with a semicircular recess in its trailing edge. A powered rotor rotatable about the axis of the recess and having blades whose tips extend close to the semicircular edge below the upper surface of the wing. The rotor produces direct upward thrust on the aircraft and also creates low pressure over the wing and higher pressure below the wing to augment the direct upward thrust of the rotor. Centrifugally moving air impinges on the edge surface of the recess to produce forward thrust.

---

This invention relates to means and method of rotor augmented lift for airplanes and included in the objects of this invention are:

First, to provide a means and method which utilizes a rotor mounted for rotation in a horizontal plane, and an airfoil having a semicircular recess in its trailing edge, the axis of which coincides with the axis of the rotor, the airfoil being located within and controlling the path of air flowing toward the rotor in such a manner that the effective lifting force produced by the airfoil is greatly increased, and is supplemented by the downward movement of air generated by the rotor.

Second, to provide a means and method of rotor augmented lift wherein a horizontal force component is produced to cause the rotor and airfoil to move horizontally while sustained by the lifting force.

Third, to provide an aircraft including a fixed wing having at least one semicircular recess and a rotor disposed with its axis coinciding with the axis of the recess so as to induce flow across the wing so as to produce a lifting force, irrespective of forward movement of the aircraft, thereby providing an aircraft capable of vertical take-off.

With the above and other objects in view as may appear hereinafter, reference is directed to the accompanying drawings in which.

Figure 2:
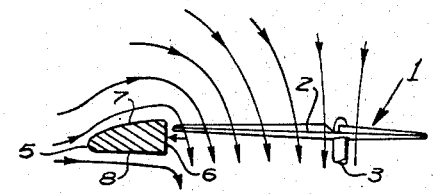
FIGURE 2 is a second view taken through 2—2 of FIGURE 1.
Figure 1:
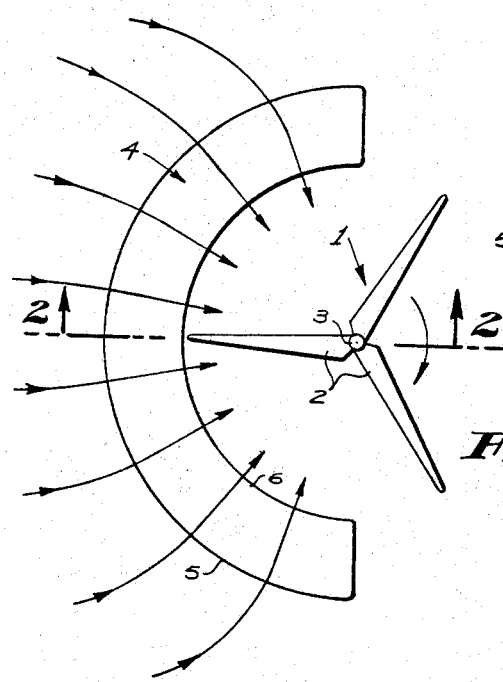
FIGURE 1 is a diagrammatical plan view showing the essential features of the rotor augmented lift.

Reference is directed to FIGURES 1 and 2. The rotor augmented lift includes a rotor 1 having blades 2 mounted on a shaft 3 for rotation about a vertical axis. Located at one side of the rotor is a semicircular airfoil 4 having a semicircular radially outer or leading edge 5 and a semicircular inner or trailing edge 6. The trailing edge need not be a sharp edge, but may have substantial vertical depth as represented in FIGURE 2 so that in effect the airfoil is essentially the forward portion of a conventional airfoil.

Between the leading and trailing edges, the airfoil forms an upper lifting surface 7 and a lower lifting surface 8.

The thrust of the rotor is upward. Considering the operation of the rotor alone, the rotor produces a negative pressure in an essentially funnel-shaped or conical shaped region of air above the rotor, and a positive pressure in a radially compressed region below the rotor, thus producing a vertical upward thrust component.

Next, considering the wing or lifting airfoil without the rotor, movement of air flowing over the upper and lower sides of the airfoil is such that the air velocity is higher across the top of the wing than across the underside. The greater this difference, the greater the lifting component.

When the rotor and airfoil are arranged as shown in the drawings, the method of producing augmented lift is as follows:

The rotor draws air across the upper surface of the airfoil, thus increasing its velocity. Simultaneously, air passing under the airfoil is reduced in velocity and deflected downwardly. As a consequence, the lift component produced in the region of the airfoil is materially increased with respect to the most efficient lift component that could be produced without the presence of the rotor. The lift component is, in fact, increased by a factor of two or three. This is accomplished without impairing the thrust of the rotor so that the full lifting force of the rotor is added to the lifting force of the airfoil.

In addition, a radially inward force component is generated when the plane of the rotor is at least above the mid-height plane of the radially inner end of the airfoil because of the high pressure below the rotor acting along the radially inner or trailing edge of the airfoil. Inasmuch as the airfoil is semi-circular, the accumulative effect of of the radially outward force component is a forward thrust.

It will be observed that the forces discussed occur without forward movement of the aircraft and may be sufficient to effect vertical take-off.

Figure 3:
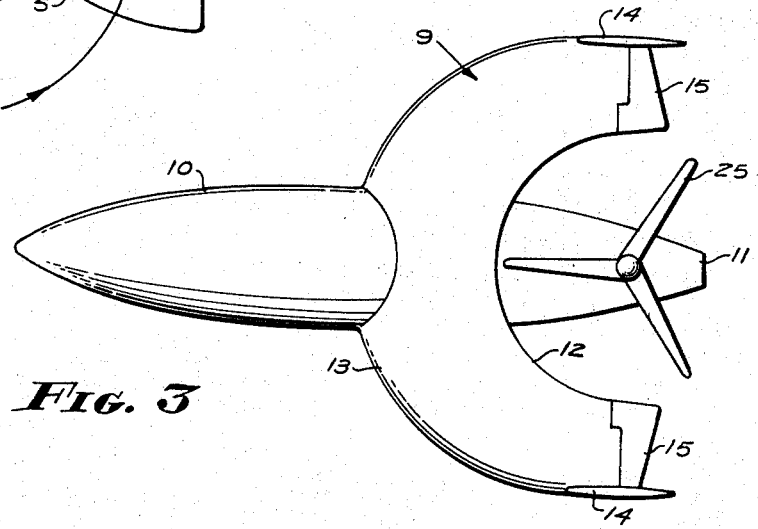
FIGURE 3 is a plan view of one form of aircraft incorporating the rotor augmented lift.
Figure 4:
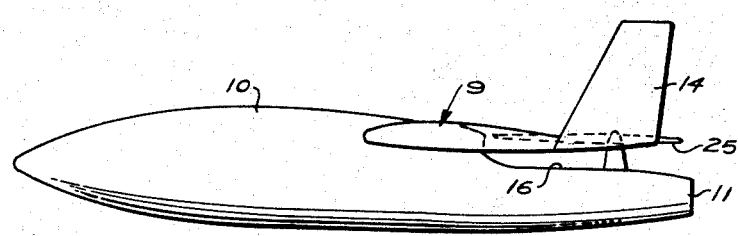
FIGURE 4 is a side view thereof.

The means and method of rotor augmented lift may be adapted to various types of aircraft; for example, as shown in FIGURES 3 and 4, the airfoil may take the form of a fixed wing 9 attached to a fuselage 10 designed for a jet discharge on its rear extremity 11. The wing is joined intermediate the extremities of the fuselage and has a semicircular radially inner or trailing edge 12, similar to the trailing edge 6 and a leading edge 13 which may also be semicircular, however, the two edges need not be equal distant but may approach each other toward their lateral extremities.

At its lateral extremities, the wing 9 is provided with horizontal control surfaces 14 and vertical control surfaces 15. Within the boundaries of the semicircular recess formed by the trailing edge 12 of the wing, the fuselage is provided with a depressed portion 16, above which is mounted a rotor 17. The axis of the rotor is concentric with the curvature of the radially inner or trailing edge 12 of the wing.

Figure 5:
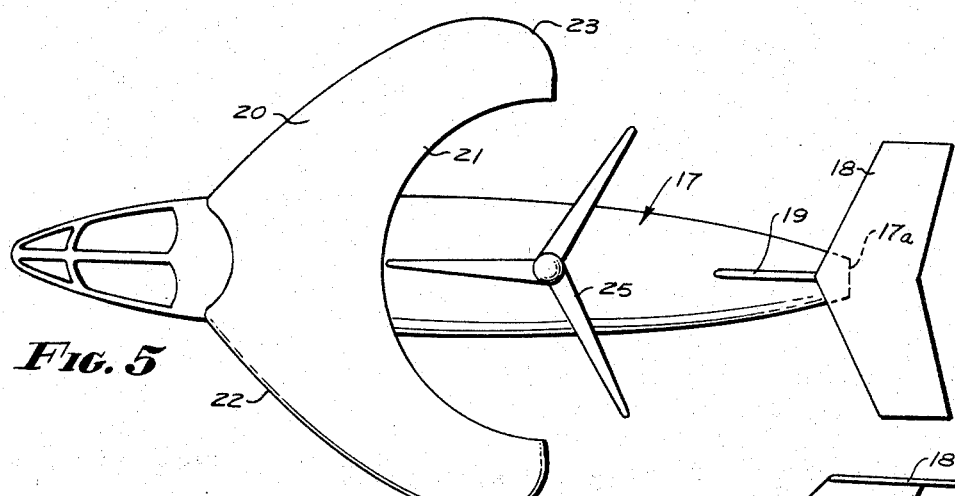
FIGURE 5 is a plan view of the rotor augmented lift adapted to another form of aircraft.
Figure 6:
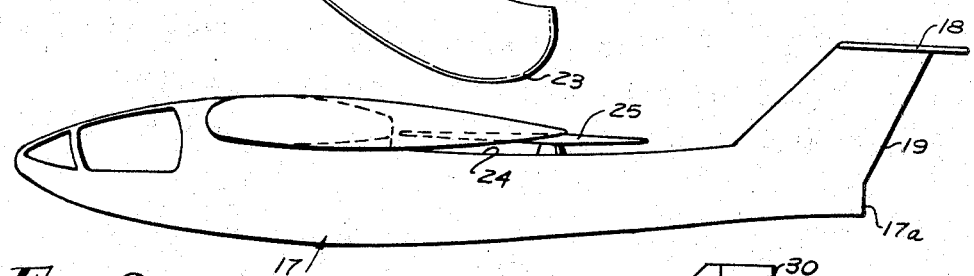
FIGURE 6 is a side view thereof.

Reference is now directed to FIGURES 5 and 6. In this case, a fuselage 17 is indicated which is provided with a jet discharge 17a at its rear end and adjacent the rear end is provided with vertical control surfaces 18 and horizontal control surfaces 19. The wing 20 in this case, is mounted forwardly on the fuselage and includes a semicircular trailing edge 21 and a swept back, but curving leading edge 22. On opposite sides of the fuselage, the lateral and rearward extremities of the wing are curved inwardly toward the trailing edge or radially inner edge 21 as indicated by 23.

Within the boundaries of the radially inner edge 21 and forwardly of the control surfaces, the fuselage 16 is depressed as indicated by 24 and a rotor 25 is mounted above the depressed portion and concentric with the radially inner edge 21.

Figure 7:
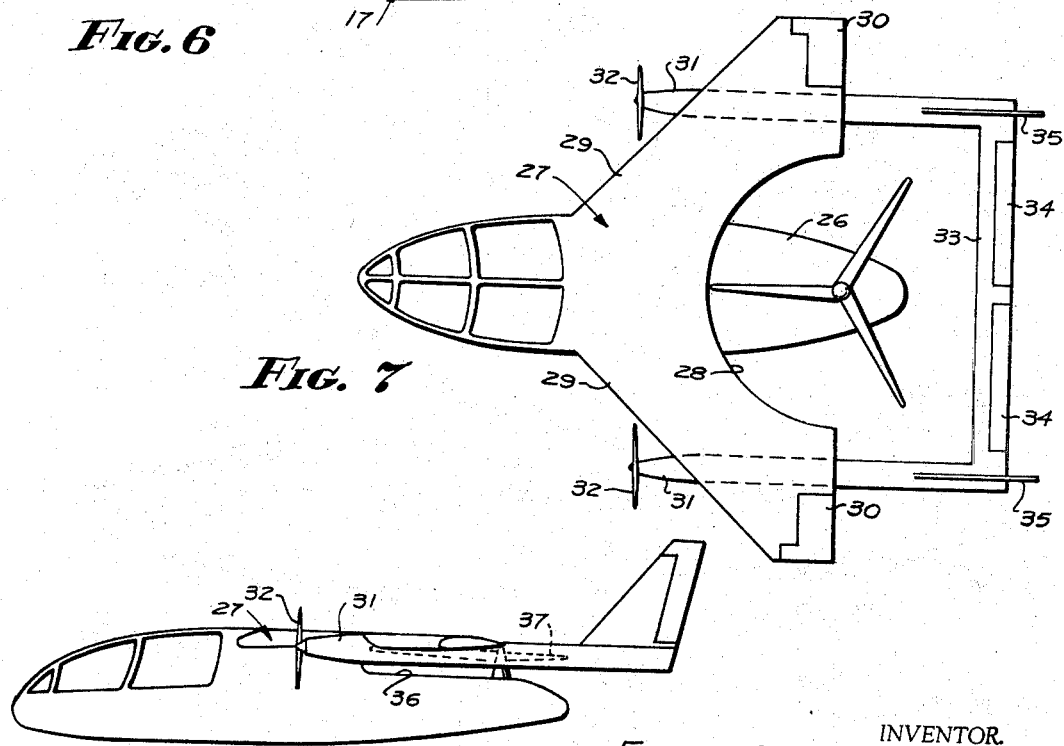
FIGURE 7 is a plan view of the rotor augmented lift adapted to another type of aircraft.
Figure 8:
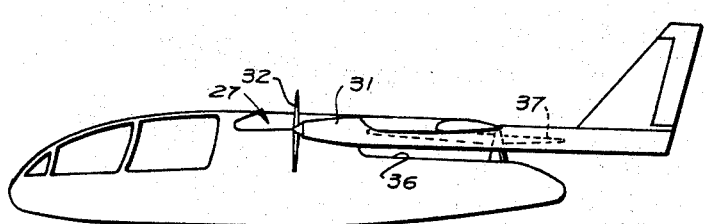
FIGURE 8 is a side view thereof.

Reference is now directed to FIGURES 7 and 8. The fuselage 26 here illustrated is provided with a wing 27 having a semicircular radially inner or trailing edge 28 and a swept back leading edge 29. The lateral extremities of the wing are provided with control surfaces 30. In this case, the engines carried in the nacelles 31 are provided with propellers 32.

The nacelles 31 extend rearwardly from the wing 27 beyond the fuselage 26 and are joined by a cross member 33. The cross member is provided with horizontal control surfaces 34 and the rear extremities of the nacelles are provided with vertical control surfaces 35.

The rear portion of the fuselage 26 is depressed as indicated by 36 and supports a rotor 37. In this case, the plane of rotation of the rotor is shown somewhat below the plane of the wing 27.

It should be emphasized that in each instance, the wing or airfoil is semicircular; that is, it extends approximately half the circumference of the figure of revolution generated by the rotor. If the wing extends an appreciable distance beyond one-half the figure of revolution, the effectiveness of the rotor-airfoil relationship is reduced, and in particular, the forward thrust accomplished by the particular rotor-airfoil relationship is reduced and the efficiency of this system for forward flight is materially impaired.

The planes defined by the wing or airfoil and rotor may coincide or the rotor may be slightly above or below the plane of the wing. Also, it will be noted that the strong vertical flow produced at the radially inner or trailing edge of the wing makes feasible a trailing edge which has substantial vertical depth, although the extent of vertical depth may vary with different wing or airfoil profiles and with the relative location of the plane of the rotor with respect to the plane of the wing or airfoil.

It should also be noted that the cross section or profile of the wing need not be constant, but may have a greater chord at its central portion than at its lateral extremity. It should be recognized that in forward flight, the air stream may not move truly radially across all portions of the wing as represented in FIGURE 1, but may flow in increasing angular relation to the radius of the wing as the vertical plane of flow moves away from the fuselage.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:
1. In an aircraft: a generally horizontal lift producing wing structure having a leading edge, a trailing edge and generally horizontally extending upper and lower surfaces, at least a portion of said trailing edge being configured to define a semicircle about a vertical axis; a power driven rotor mounted for rotation about said axis and having generally radial blades below said upper surface extending to close proximity to but radially inwardly of said trailing edge and arranged to produce downward air flow at said trailing edge, the region rearwardly of said rotor and between said rotor and said trailing edge being free of air directing means whereby said rotor produces direct upward thrust on said aircraft and also creates a low pressure flow field across said upper surface and a high pressure flow field across said lower surface to thereby produce additional lift for said aircraft.

2. An aircraft as defined in claim 1 wherein at least a portion of said trailing edge defining said semicircle defines a generally upstanding and generally rearwardly facing surface radially outwardly of said blades whereby air thrown radially outwardly by said blades produces forward thrust on said aircraft.

3. An aircraft as defined in claim 1 including further means thereon for producing forward thrust on said aircraft, independently of operation of said rotor.

References Cited
UNITED STATES PATENTS

| | | | |
|---|---|---|---|
| 3,129,905 | 4/1964 | Taylor. | |
| 1,879,857 | 9/1932 | Schafran | 244—12 |
| 2,461,435 | 2/1949 | Nevmann | 244—12 |
| 3,033,491 | 5/1962 | Clark | 244—23 |
| 3,049,320 | 8/1962 | Fletcher | 244—12 |
| 3,288,400 | 11/1966 | Nazir | 244—43 |

MILTON BUCHLER, *Primary Examiner.*

B. BELKIN, *Assistant Examiner.*